(12) United States Patent
Miciukiewicz

(10) Patent No.: US 7,328,921 B1
(45) Date of Patent: Feb. 12, 2008

(54) FLUID ROTARY JOINT

(75) Inventor: Michael J. Miciukiewicz, Trumbull, CT (US)

(73) Assignee: Northrop Grumman Corporation, Los Angeles, CA (US)

( * ) Notice: Subject to any disclaimer, the term of this patent is extended or adjusted under 35 U.S.C. 154(b) by 95 days.

(21) Appl. No.: 11/097,194

(22) Filed: Apr. 4, 2005

Related U.S. Application Data

(60) Provisional application No. 60/559,973, filed on Apr. 7, 2004.

(51) Int. Cl.
*F16L 27/00* (2006.01)

(52) U.S. Cl. .................. 285/275; 285/272; 285/281; 285/121.3; 285/121.6

(58) Field of Classification Search ............ 285/275, 285/281, 272, 121.3, 121.6
See application file for complete search history.

(56) References Cited

U.S. PATENT DOCUMENTS

| | | | | |
|---|---|---|---|---|
| 1,925,091 A | * | 9/1933 | Crossen, Jr. ............. | 285/121.1 |
| 2,657,016 A | * | 10/1953 | Grable ...................... | 175/215 |
| 2,805,087 A | * | 9/1957 | Shaw et al. ............... | 285/121.4 |
| 3,586,352 A | * | 6/1971 | Smulders ................. | 285/121.5 |
| 4,142,742 A | * | 3/1979 | Cornett et al. ........... | 285/121.3 |
| 5,895,077 A | * | 4/1999 | Sigmundstad ............ | 285/96 |
| 6,851,724 B2 | * | 2/2005 | Pittman, II ............... | 285/275 |

* cited by examiner

*Primary Examiner*—David Bochna
(74) *Attorney, Agent, or Firm*—Rothwell, Figg, Ernst & Manbeck

(57) ABSTRACT

A device which allows fluid to enter and/or exit the device axially or radially thru multiple ports, on and/or offset from the axis of rotation. One end of the assembly can be rotated axially with respect to the other while keeping fluids isolated from each other. Compared to existing multi-path fluid swivel joint designs, this approach is simple in construction, compact in size, and exhibits a relatively low pressure drop.

19 Claims, 10 Drawing Sheets

FLUID ROTARY JOINT

This application claims the benefit of U.S. Provisional Patent Application No. 60/559,973, filed Apr. 7, 2004, the disclosure of which is incorporated herein by reference in its entirety.

The work described in this application was done in connection with Air Force contract number F19628-00-C-0100. The government may have certain rights to this invention.

BACKGROUND OF THE INVENTION

1. Field of the Invention

The present invention relates to fluid joints. More specifically, the preferred embodiments relate to multi-path fluid joints, such as, e.g., multi-path fluid swivel or rotary joints.

2. Discussion of the Background

There is a need for improved fluid joints, such as fluid joints that are simple to construct and compact in size.

SUMMARY OF THE INVENTION

The preferred embodiments of the present invention can significantly improve upon existing methods and/or apparatuses.

As compared to existing multi-path fluid swivel or rotary joint designs, the preferred embodiments of the present invention enable, among other things, simplicity in construction, compactness in size, reduction in pressure drop and/or other benefits.

According to some embodiments, a multi-path rotary joint for flowable mediums includes: a first shell rotatably received within a second shell such as to rotate respectively about an axis; the first and second shells including at least one flow path from outer positions from ports that are offset from the axis to inner positions at which the at least one flow path is generally aligned with and generally co-axial to the axis.

In another aspect, the present invention provides a device having more than one fluid passage, wherein the fluid passages are isolated from each other. In some embodiments, the device includes: a first generally cylindrical hollow shell having an open end and a closed end opposite the open end, wherein a first hole and a second hole are formed in the closed end; a second generally cylindrical hollow shell having an open end and a closed end opposite the open end, wherein a third hole and a fourth hole are formed in the closed end; a first tubular structure housed within and connected to the first shell, the first tubular structure having a first open end and a second open end opposite the first open end, the first open end being in fluid communication with the first hole; and a second tubular structure housed within and connected to the second shell, the second tubular structure having a first open end and a second open end opposite the first open end, the first open end being in fluid communication with the third hole. Preferably, the outer diameter of the second shell is less than the inner diameter of the first shell, the open end of second shell is inserted into the open end of the first shell, and the second open end of the first tubular structure is connected to and aligned with the second open end of the second tubular structure, thereby forming a fluid passage between the first hole and the third hole. Advantageously, a second fluid passage, which is isolated from the first fluid passage, may be at least partially defined by an outer surface of the tubular structures and an inner surface of the second shell, wherein the second fluid passage connects the second hole with the fourth hole.

The above and other aspects, features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, help illustrate various embodiments of the present invention and, together with the description, further serve to explain the principles of the invention and to enable a person skilled in the pertinent art to make and use embodiments of the invention. In the drawings, like reference numbers indicate identical or functionally similar elements.

DETAILED DESCRIPTION OF PREFERRED EMBODIMENTS

Figure 1A:
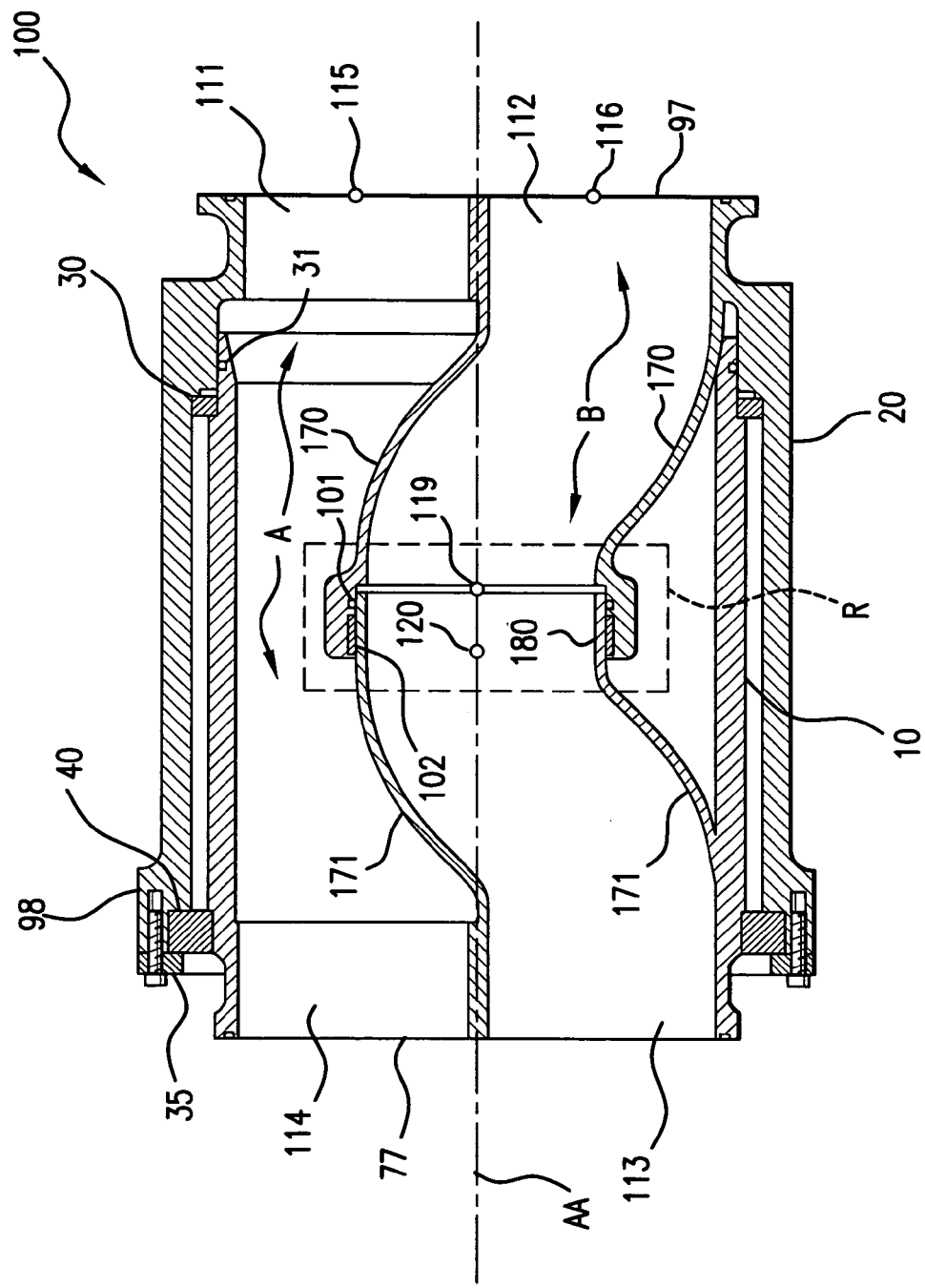
FIG. 1(A) is a cross-sectional side view of one embodiment taken along the line J-J in FIG. 1(C).

In some preferred embodiments, a rotary or swivel joint device 100 is provided that can carry fluid along multiple flow paths (i.e., substantially and/or entirely separate flow paths in some preferred embodiments). In preferred embodiments, the device 100 further enables high flow rates. In addition, in preferred embodiments, the device further enables the provision of a small outer dimension (such as, e.g., a small outer housing). In some embodiments, the multiple flow paths includes two flow paths, while in other embodiments, the multiple flow paths includes three or more flow paths. In some preferred embodiments, each of the flow paths is substantially separate, such that little or no fluid communication occurs between the flow paths.

FIGS. 1(A) through 4 show an illustrative two-flow-path embodiment. As shown, in this embodiment, a joint device 100 is provided that includes two generally cylindrical shells 10 and 20. In this embodiment, the cylindrical shell 10 is rotatably received within the outer structural shell 20. That is, both shells 10 and 20 are mounted so as to rotate relative to one another about the longitudinal axis AA of shells 10 and 20.

Preferably, bearings and/or other sealing means can be used to seal the internal volumes while allowing the components to rotate about the common longitudinal axis AA. In the illustrated embodiment, in order to facilitate relative rotation, radial bearings 30 can be employed as shown and to facilitate sealing an O ring 31 (or the like) can be employed as shown. The radial bearings can, e.g., carry external radial loads and can maintain seal alignment. Additionally, thrust bearings 40 can also be employed as shown (see FIG. 2E), and, in some cases, a bearing retainer 35 can also be employed as shown to limit movement in an axial direction.

Figure 1B:
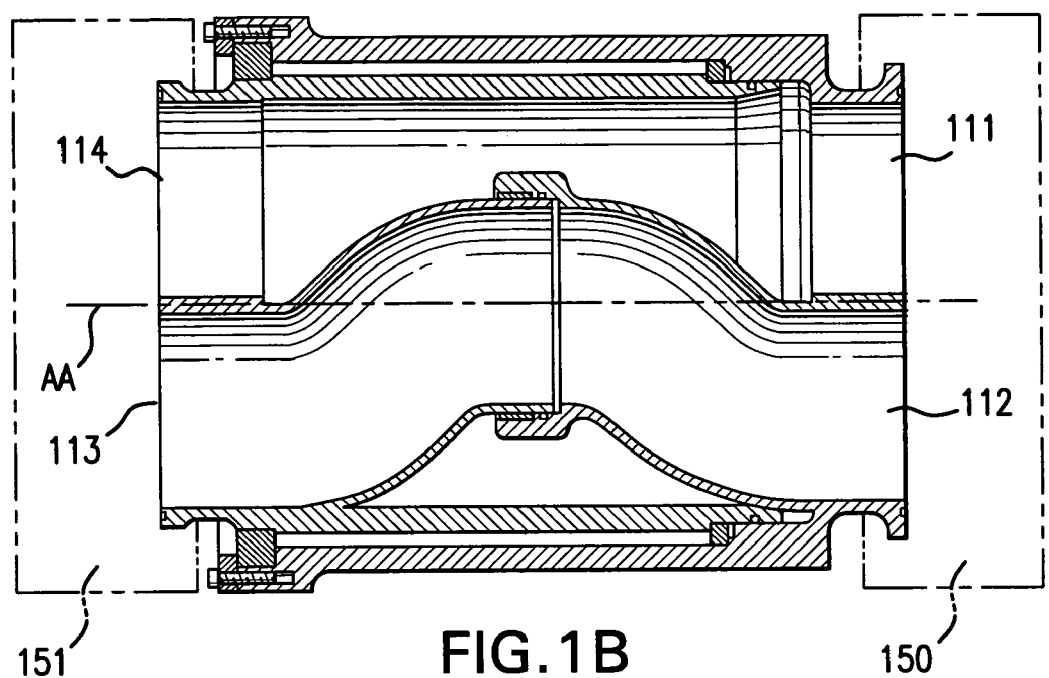
FIG. 1(B) is a broken away side view of a device similar to that shown in FIG. 1(A).
Figure 1C:
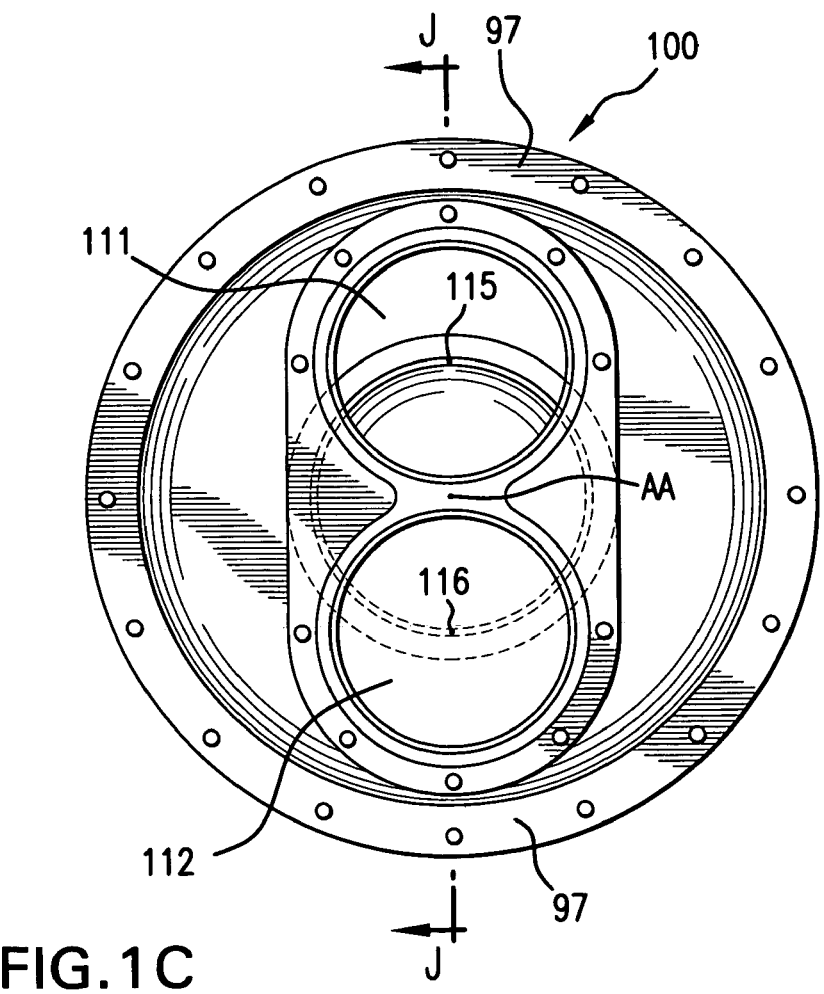
FIG. 1(C) is an end view from the left side of FIG. 1(A).
Figure 1D:
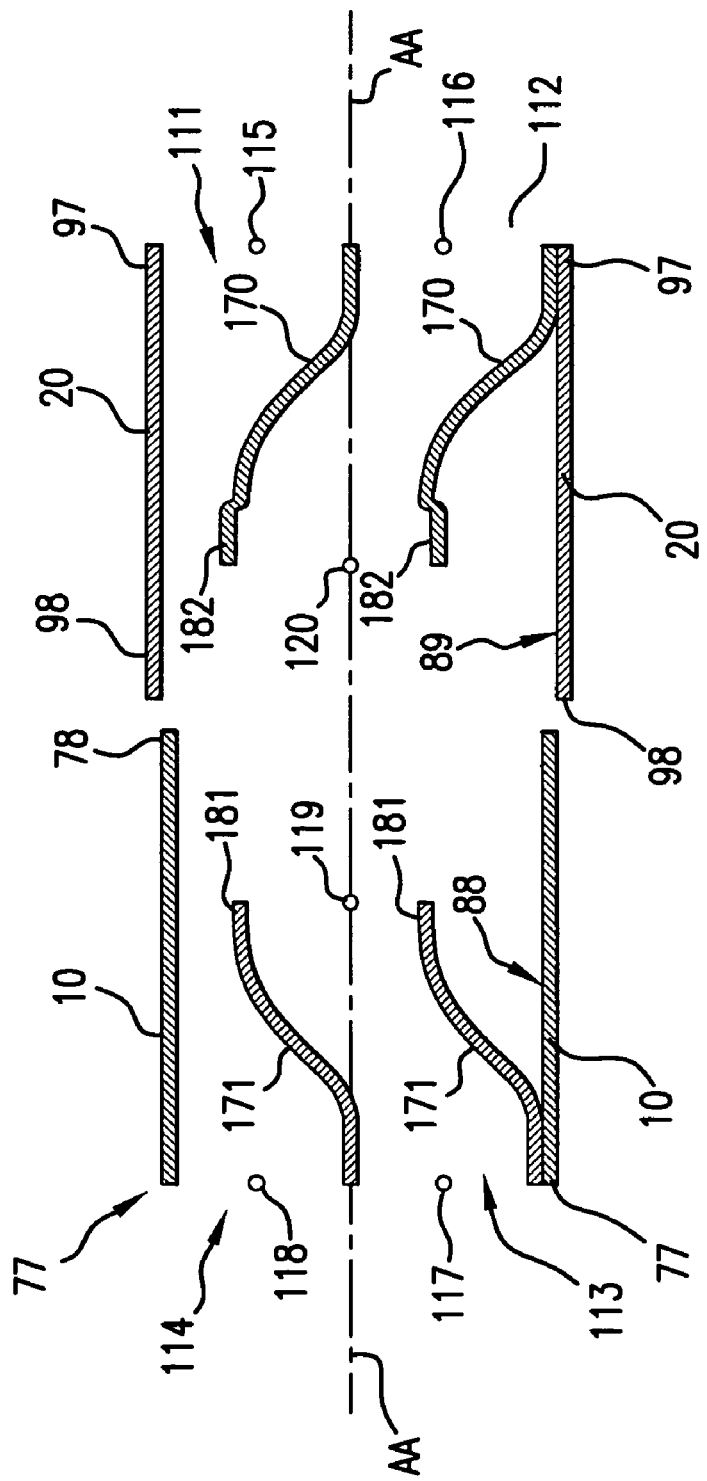
FIG. 1(D) is an exploded cross-sectional side view of one embodiment.

As illustrated in FIGS. 1(A) and 1(D), in some embodiments of fluid rotary joint 100, inner shell 10 and outer shell 20 both have a tubular structure (i.e., a structure having the shape and/or function of a tube) housed within the shell and connected to an inner surface thereof. For example, tubular structure 171 ("tube 171") is housed within shell 10 and connected to inner surface 88 of shell 10. Accordingly, when shell 10 rotates about axis AA, so will tube 171. Similarly, tubular structure 170 ("tube 170") is housed within shell 20 and connected to inner surface 89 of shell 20. Accordingly, when shell 20 rotates about axis AA, so will tube 170.

In some embodiments, tube 171 extends from a first end 77 of shell 10 to a point that is about midway between first end 77 and the second end 78 of shell 10. Similarly, in some embodiments, tube 171 extends from a first end 97 of shell 20 to a point that is about midway between first end 97 and the second end 98 of shell 20.

In some embodiments, shell 10 is open at end 78, but closed at end 77 (see FIG. 1(D)). Preferably, holes 114 and 113 are formed in closed end 77. Similarly, in some embodiments, shell 20 is open at 98, but closed at end 97, and holes 111 and 112 are formed in closed end 97. Preferably, tube 171 is positioned such that all fluid entering hole 113 flows trough tube 171 and tube 170 is positioned such that all fluid entering hole 112 flows trough tube 170.

Referring now to FIGS. 1(A) and 1(B), FIGS. 1(A) and 1(B) shown joint 100 after open end 78 of shell 10 has been fully inserted into open end 98 of shell 20. As shown, tube 171 mates with tube 170 at region R. Tube 171 mates with tube 170 so that the tubes 171, 170 are in fluid communication and so that the tubes 170,171 can maintain fluid communication while shell 10 and/or 20 rotates about axis AA. That is, after tube 171 is mated with tube 170, all (or substantially all) fluid that enters tube 171 through hole 113 can flow through tube 171 then through tube 170 and then out hole 112, or vice-versa. Accordingly a flow path (B) is formed in joint 100. Additionally, a second flow path (A) is also formed in joint 100. The second flow path (A) is bounded by the outer surface of tubes 170, 171 and the inner surface of shells 10, 20 and fluidly connects hole 114 with hole 111. That is, all (or substantially all) fluid that enters hole 114 may flow through flow path A and exit hold 111 and vice-versa.

In the illustrated embodiment, the center 115 of hole 111 and the center 116 of hole 112 are located approximately half way between the rotational axis AA and end 97 of shell 20 as shown in FIGS. 1(C) and 1(D). Similarly, the center 117 of hole 113 and the center 118 of hole 114 are located approximately half way between the rotational axis AA and end 77 of shell 10 as shown in FIG. 1(D).

In preferred embodiments, flow path B in the embodiment shown in FIGS. 1(A) and 1(D), extends to the axis AA. For example, the center point 119 of end 181 of tube 171 and/or the center point 120 of end 182 of tube 170 is/are positioned on axis AA. Preferably, a straight line drawn from point 119 to point 120 is in line with axis AA. Accordingly, because the ends of tube 170/171 are not aligned, tube 170/171 is not straight but is curved.

In preferred embodiments, there is included means to seal the connection between tubes 170, 171. For example, in the illustrative embodiment shown in FIG. 1(A) and FIG. 2D, an additional seal 101 (e.g., an O ring) can be used to seal the connection point. Additionally, a bearing or Teflon 102 may be provided to facilitate rotation of tube 170 relative to tube 171 and vice-versa. However, in some embodiments, a seal can potentially be omitted. In some embodiments, a small gap can even be tolerated as long as the degree of separation between the flow paths is within a tolerable range. For example, in some embodiments, a small gap of a few millimeters or less may be tolerated. In other embodiments, a substantially fluid tight seal can be employed. In other embodiments, a substantially airtight or pneumatic seal can be employed. In some embodiments, little or no sealing can be provided as long as the constituents within the flow paths remain substantially separate during use.

In use, the joint device 100 can be mounted between two members 150 and 151 (shown schematically in FIG. 1(B)) which are rotated with respect to one another. With a joint device, such as, e.g., shown in the figures, one hole or port at one end face of the joint device will be internally connected to one hole or port at the other end face of the joint device with a dynamic seal therebetween. In this manner, fluid can readily flow through the connected duct, thus forming a first fluid flow path. Additionally, fluid can also flow around the ducting and within the fluid shell creating a second flow path A as described above.

In various embodiments, the two members 150 and 151 can include any relatively rotated members that may benefit from the use of such a rotary joint.

Figure 6:
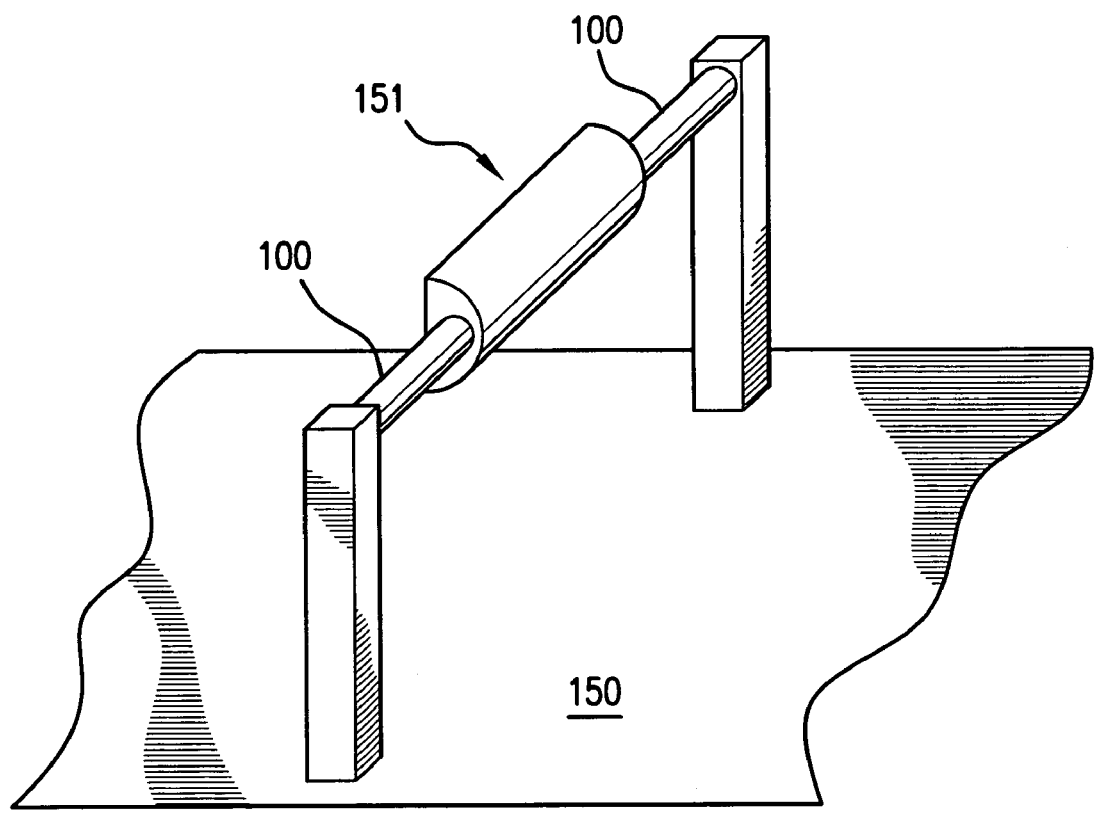
FIG. 6 is a perspective view of an illustrative environment in which a joint device may be employed.

By way of example, any rotated members requiring the passing of one or more of the following may benefit from embodiments herein: a) fluid, such as, e.g., fluid coolant, fluid fuel, etc., b) gas, such as, e.g., air, gaseous fuel, etc., and/or c) any other flowable medium that may be transported via flow paths as described herein. By way of example, and not limitation, the members 150 and 151 can include, e.g., a rotated or swiveled antenna and an antenna support structure such as, e.g., a fixed support or a moving support such as, e.g., a vehicle, such as, e.g., an aircraft or airplane. In the illustrative example shown in FIG. 6, two joint devices 100 are employed so as to rotatably support an antenna 151 between support members connected to an airplane 150.

In various other applications, one or more rotary joint 100 can be used in robotic applications requiring fluid and/or pneumatic flow, such as, e.g., bi-directional fluid flow, multiple fluid and/or pneumatic feeds and/or other flow requirements.

While FIG. 1(A) to 4 illustrate some embodiments having two flow paths, the principles herein can be applied within embodiments including three or more flow paths. By way of example, in some embodiments, 3 flow paths can be employed, or 4 flow paths or even more flow paths can be employed, such as, e.g., shown in FIGS. 5(A), 5(B), 5(C), 5(D), 5(E) and/or 5(F). These latter figures help to illustrate various examples in which ports entering the end faces are offset from one another. These figures are, however, merely illustrative and a wide variety of alternative structures can be employed.

Figure 5A:
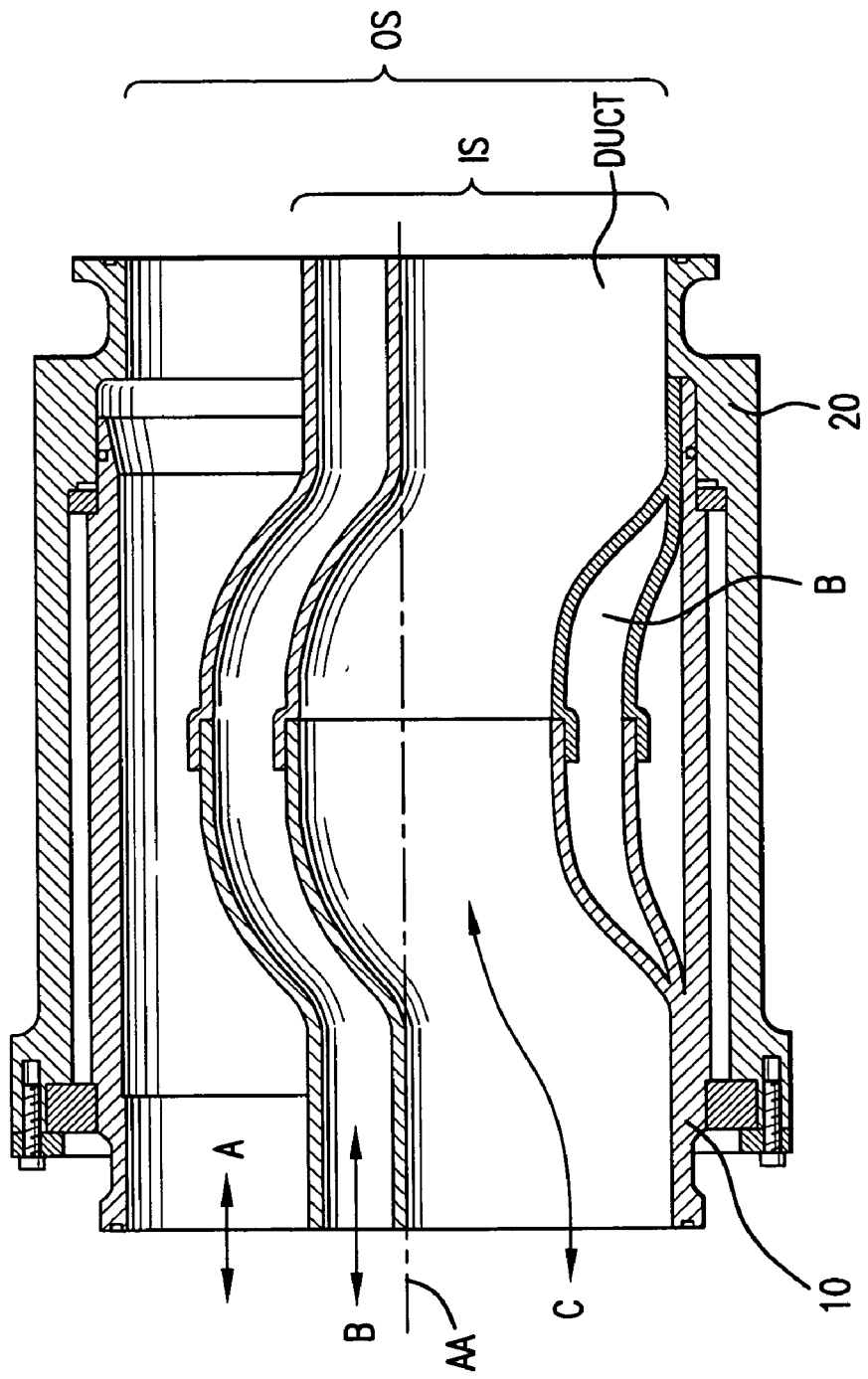
FIG. 5(A) is a cross-sectional side view of another embodiment having plural flow paths.

With reference to FIG. 5(A), as illustrated, in some embodiments, the shell members 10 and 20 can include additional flow paths. In this illustrative example, by incorporating a duct within an inner shell IS within an outer shell OS, a three path device can be achieved. As shown, these three paths A, B and C are generally similar to that described above, except that two of the paths lead to the axis AA for a co-axial connection between the joint halves. Once again, the connections within the region R may include seals, bearings and/or the like as needed depending on circumstances.

Figure 5B:
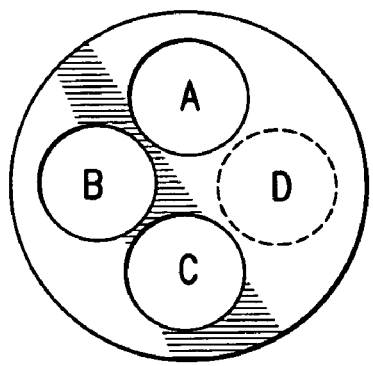
FIG. 5(B) is an end view of the embodiment shown in FIG. 5(A).
Figure 5C:
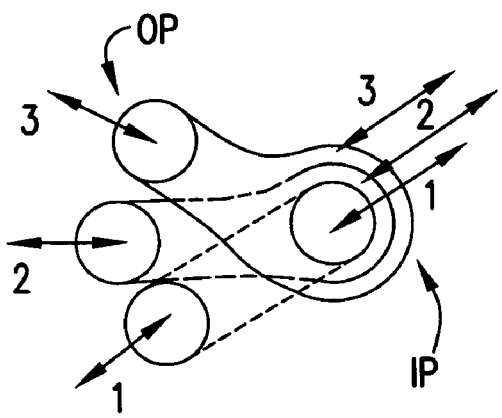
FIG. 5(C) is a schematic diagram depicting illustrative flow paths.
Figure 5D:
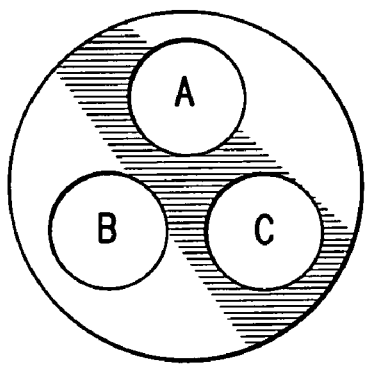
FIGS. 5(D) to 5(F) are end views according to other embodiments.
Figure 5E:
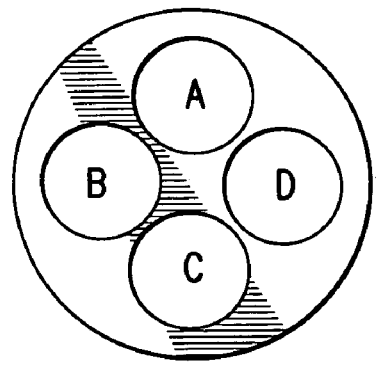
Figure 5F:
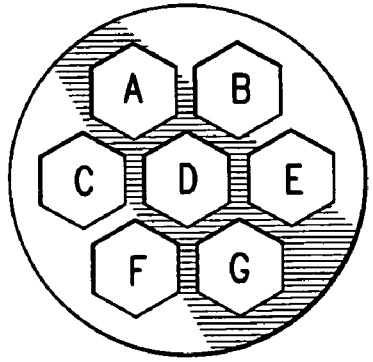

As should be appreciated based on this disclosure, the inner duct that creates the path C is surrounded by the inner shell that creates the path B within a region R, but the path B is formed so as to extend around the inner duct and to lead to an exit port, such as, e.g., seen in FIG. 5(B) as one example. In this regard, the cross-section of the path C through the inner shell IS can follow a varied configuration as it extends around the inner shell. As illustrated in dashed lines in FIG. 5(B), additional flow paths, such as, e.g., flow path D, can be employed. FIG. 5(C) illustrates generally how multiple flow paths are created that are generally co-axial at an inner position IP and are adjacent one another (and preferable in an offset arrangement from one another) at an outer position OP.

Figure 2A:
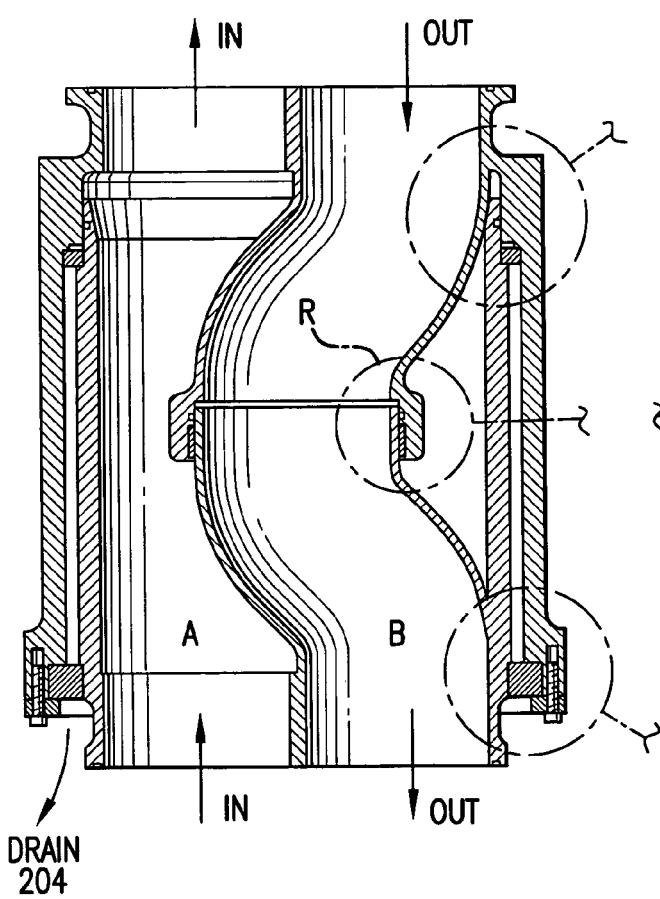
FIG. 2(A) is a cross-sectional side view of an embodiment similar to that shown in FIG. 1(A) taken along the line E-E in FIG. 2(B).
Figure 2C:
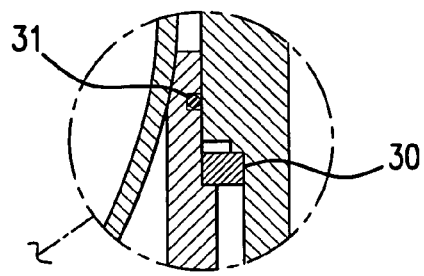
FIG. 2(c) illustrates a bearing 30 and an o-ring 31.
Figure 2D:
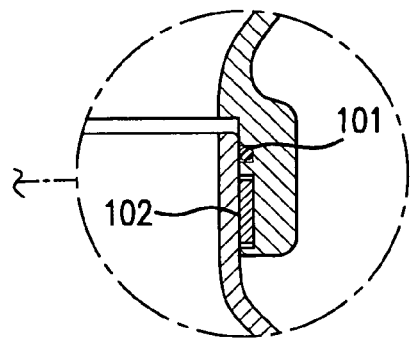
FIG. 2(d) illustrates a seal 101 and a bearing 102.
Figure 2E:
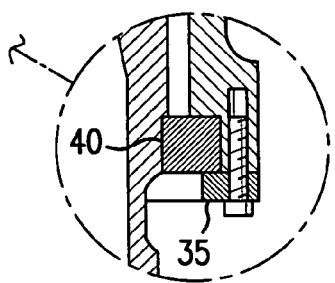
FIG. 2(B) is an end view from the top side of FIG. 2(A).
FIG. 2(2) illustrates a bearing retainer 35 and a thrust bearing 40.
Figure 2B:
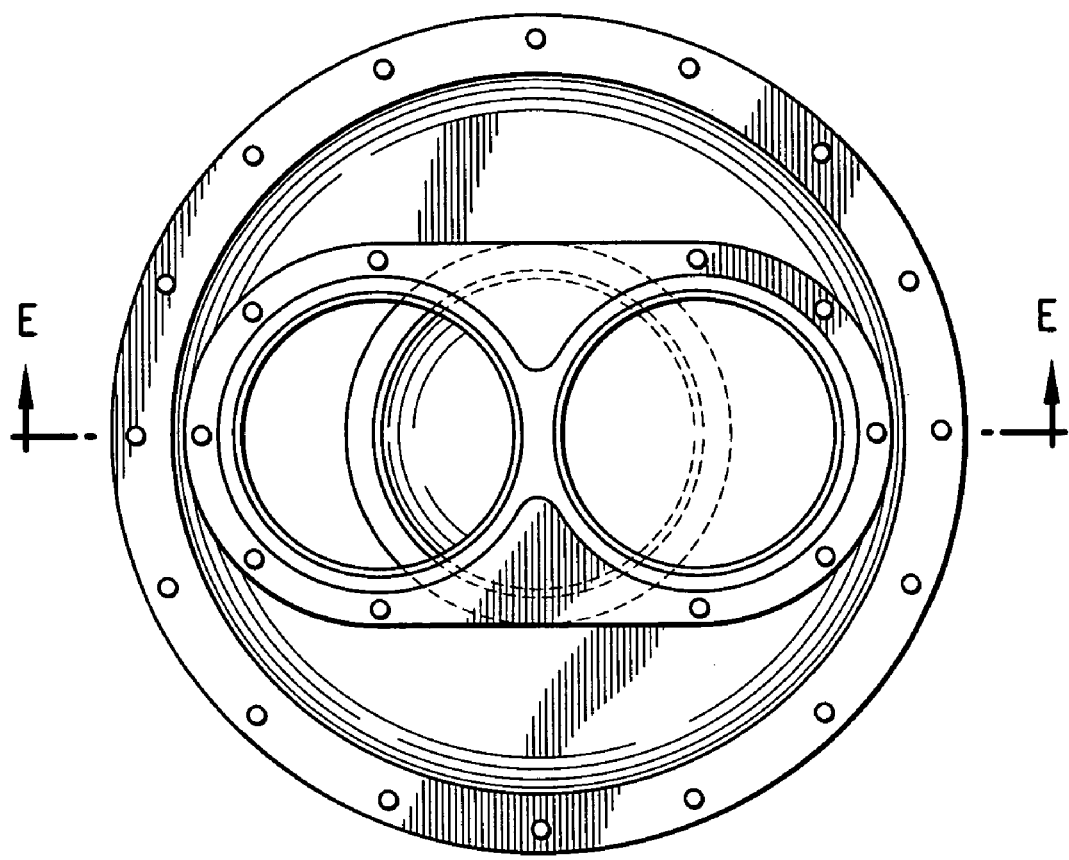

FIGS. 2(A) and 2(B) show features that may be employed in some specific implementations of the embodiment shown in FIGS. 1(A)-1(D). With reference to the cross-sectional view in FIG. 2(A), in some illustrative applications, the path A can be used for inflow to a device to be rotated (such as, e.g., a rotated antenna) and the path B can be used for outflow. However, in other embodiments, the flow can be reversed such that B is for inflow and A is for outflow.

In some embodiments, as shown, a drain can be used to drain coolant or other fluid or the like that may pass between the shells 10 and 20, such as, e.g., around the bearings and/or seals. In some embodiments, the inner shell 10 can be connected to a fixed support (such as, e.g., a vehicle) while the outer shell 20 is connected to a rotated member (such as, e.g., an antenna) or vise versa.

Figure 3:
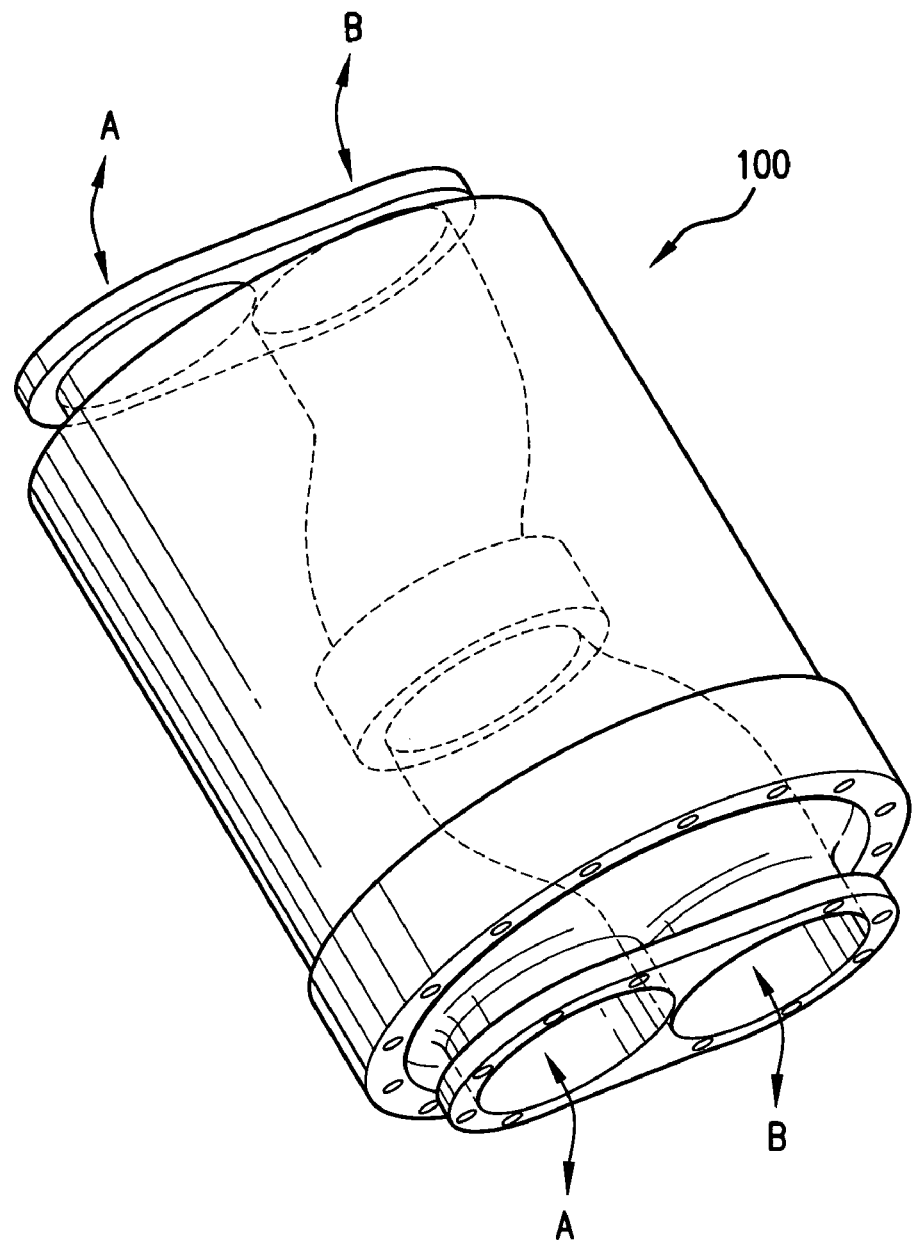
FIG. 3 is a schematic transparent perspective view of a device similar to that shown in FIG. 1(A).
Figure 4:
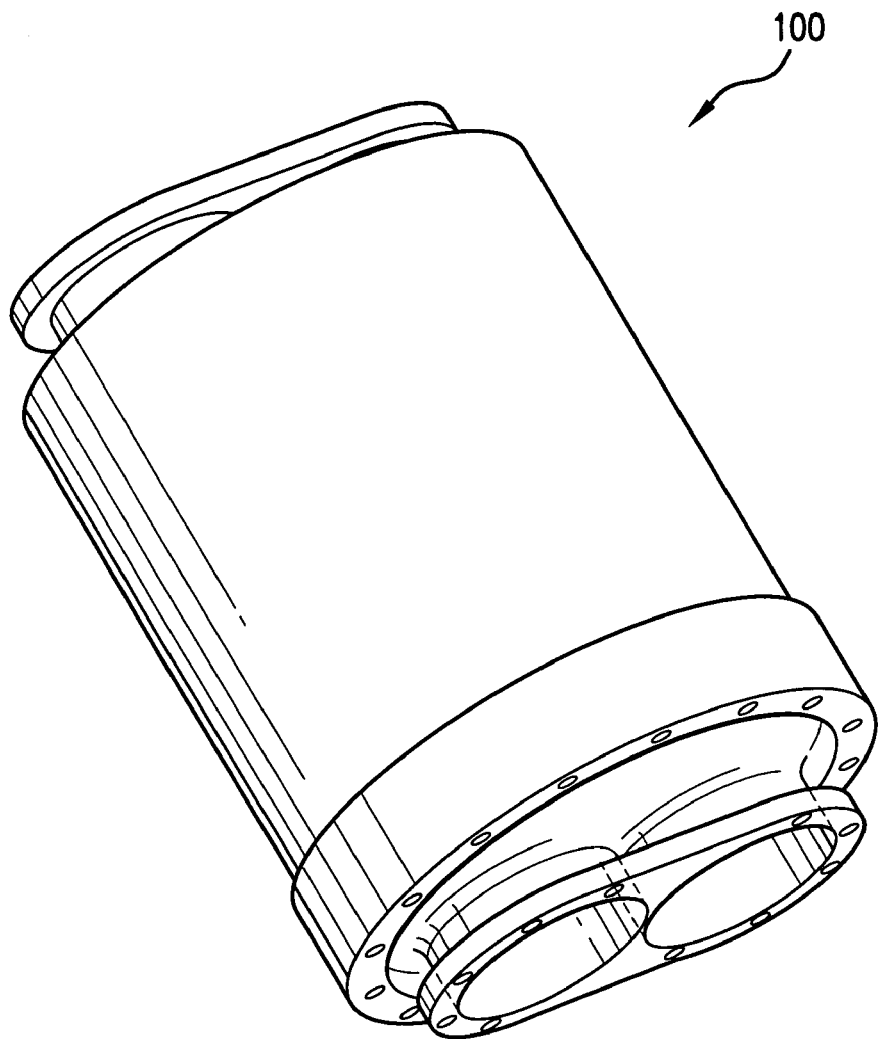
FIG. 4 is a perspective view of a device similar to that shown in FIG. 1(A).

While a variety of sizes, dimensions, etc., can be employed in some embodiments, FIGS. 1(A)-(C), FIGS. 2(A)-(B), FIG. 3 and FIG. 4 show illustrative embodiments illustrated generally proportionally and to scale. FIG. 3 is a perspective view depicting a joint device 100 such as shown in FIGS. 1(A)-(C) with internal features depicted in dotted and dashed lines to facilitate reference. FIG. 4 is a non-transparent perspective view depicting a joint device 100 similar to that shown in FIG. 3.

In various embodiments, a variety of benefits can be achieved. By way of example, the preferred embodiments can provide flow paths that are especially good for high flow environments and/or that can enable a significantly reduced pressure dropping across a joint. In addition, the use of offset ports further enables the device to be minimized and to fit into small and/or tight places and/or to have a compact size and shape.

In some illustrative and non-limiting embodiments, the outer diameter of the outer shell 20 can be as small as about 6 inches or less, and, in some other preferred embodiments, as small as about 5 inches or less, and, in some other preferred embodiments, as small as about 4 inches or less, and, in some other preferred embodiments, as small as about 3 inches or less, and, in some other preferred embodiments, as small as about 2¼ to 2¼ inches or even less. In some illustrative embodiments, a diameter of about 2¼ to 2¾ inches can be used to handle fluid flow rates of more than about 100 gallons per minute, and in some other embodiments about 125 gallons per minute. By way of example, such embodiments may be highly advantageous in handling coolant (such as, e.g., fluid and/or gas) used in rotary and/or swiveling antenna environments.

In some embodiments, the members 150 and 151 can be rotated or swiveled relative to one another back and forth in an arc of less than 360 degrees, while in other embodiments, the members 150 and/or 151 can be rotated more than 360 degrees relative to one another and, more preferably, rotated substantially continuously.

In various embodiments, the flow paths can be used for variety of purposes. However, in some non-limiting and illustrative embodiments, the flow paths leading towards the center of the co-axial inner position IP can be used to convey fluid and/or gas that may be desired to be maintained less exposed to environmental temperatures and/or the like. While the shell members 10 and 20 can be made with a variety of materials, in some preferred embodiments, the materials include metal components.

Figure 7:
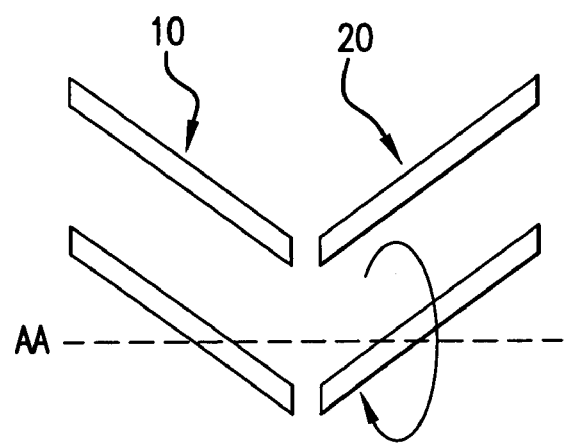
FIG. 7 is a schematic diagram showing joint member relationships according to other embodiments of the joint device

As depicted in FIG. 7, in some embodiments the shell members 10 and 20 can be constructed in a variety of manners. By way of example, rather than being rotatably received within one another, the members can be merely rotatably mounted adjacent to one another via other means, such as, e.g., independent supports (not shown). Additionally, in some embodiments, as long as their contacting portions rotate in a common plane, or about a common axis, such as e.g., axis AA, shown in FIG. 7, the members 10 and 20 do not necessarily need to have a central axis through which the axis AA passes as shown in FIG. 7 as a schematic example.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A multi-path rotary joint for flowable mediums, comprising:
   a first shell; and
   a second shell positioned at least partially within the first shell so that the longitudinal axis of the first shell is coincident with the longitudinal axis of the second shell, wherein the first shell is capable of rotating relative to the second shell about the coincident axis, wherein
   said first shell houses a first tubular structure extending from a first end of said first shell to a point between said first end and a second end of said first shell such that the first tubular structure does not extend beyond any end of the first shell,
   said second shell houses a second tubular structure extending from a first end of said second shell to a point between said first end and a second end of said second shell such that the second tubular structure does not extend beyond any end of the second shell, and
   said first tubular structure is mated with said second tubular structure to form a continuous flow path.

2. The multi-path rotary joint of claim 1, wherein said at least one flow path includes a plurality of such flow paths.

3. The multi-path rotary joint of claim 1, in combination with a robotic assembly.

4. The multi-path rotary joint of claim 1, wherein said first or said second shell is connected to a rotatable antenna.

5. The multi-path rotary joint of claim 4, wherein said rotary is installed in an aircraft.

6. The multi-path rotary joint of claim 1, wherein the first shell is in the form of a tube that is open at one end and closed at the opposite end, and wherein a first hole and a second hole are formed in the closed end of the first shell.

7. The multi-path rotary joint of claim 6, wherein the second shell is in the form of a tube that is open at one end and closed at the opposite end, and wherein a first hole and a second hole are formed in the closed end of the second shell.

8. The multi-path rotary joint of claim 7, wherein the open end of the second shell is inserted into the open end of the first shell, a first fluid passageway connects the first hole formed in the closed end of the first shell to the first hole formed in the closed end of the second shell, and a second fluid passageway connects the second hole formed in the closed end of the first shell to the second hole formed in the closed end of the second shell.

9. A rotary joint, comprising a first shell rotatably received substantially entirely within a second shell such as to rotate respectively about a common longitudinal axis; said first and second shells defining (1) a first fluid passage connecting a first hole in the first shell to a first hole in the second shell and (2) a second fluid passage, which is isolated from the first fluid passage, connecting a second hole in the first shell to a second hole in the second shell, wherein said second fluid passage is comprised of a first tubular portion connected to and housed within said first shell, but not extending beyond any end of said first shell, coupled to a second tubular portion connected to and housed within said second shell, but not extending beyond any end of said second shell.

10. The rotary joint of claim 9, further comprising bearings disposed between an outer surface of the first shell and an inner surface of the second shell to facilitate rotation of the first and/or second shell about the common longitudinal axis.

11. The rotary joint of claim 9, wherein the tubular structures together with an inner surface of the first shell and an inner surface of the second shell define the second fluid passage.

12. The rotary joint of claim 9, wherein ball bearings are disposed between an outer surface of the first tubular structure and an inner surface of the second tubular structure.

13. The rotary joint of claim 9, wherein ball bearings are disposed between an outer surface of the second tubular structure and an inner surface of the first tubular structure.

14. The rotary joint of claim 9, wherein each said hole has a center point, and each center point is positioned at a different point offset from the common longitudinal axis.

15. A multi-path rotary joint for flowable mediums, comprising:

a first shell; and a second shell positioned at least partially within the first shell so that the longitudinal axis of the first shell is coincident with the longitudinal axis of the second shell, wherein the first shell is capable of rotating relative to the second shell about the coincident axis, wherein said first shell houses a first tubular structure housed within a second tubular structure, said second shell houses a third tubular structure housed within a fourth tubular structure, and said first tubular structure is mated with said third tubular structure to form a first continuous flow path and said second tubular structure is mated with said fourth tubular structure to form a second continuous flow path.

16. The multi-path rotary joint of claim 15 wherein said first tubular structure and said second tubular structure extend from a first end of said first shell to a point between said first end and a second end of said first shell.

17. The multi-path rotary joint of claim 15 wherein said third tubular structure and said fourth tubular structure extend from a first end of said second shell to a point between said first end and a second end of said second shell.

18. The rotary joint of claim 15, wherein the second and fourth tubular structures together with an inner surface of the first shell and an inner surface of the second shell define a third continuous flow path.

19. The rotary joint of claim 15, wherein said second shell is positioned substantially entirely within said first shell.

* * * * *